Figure 1:
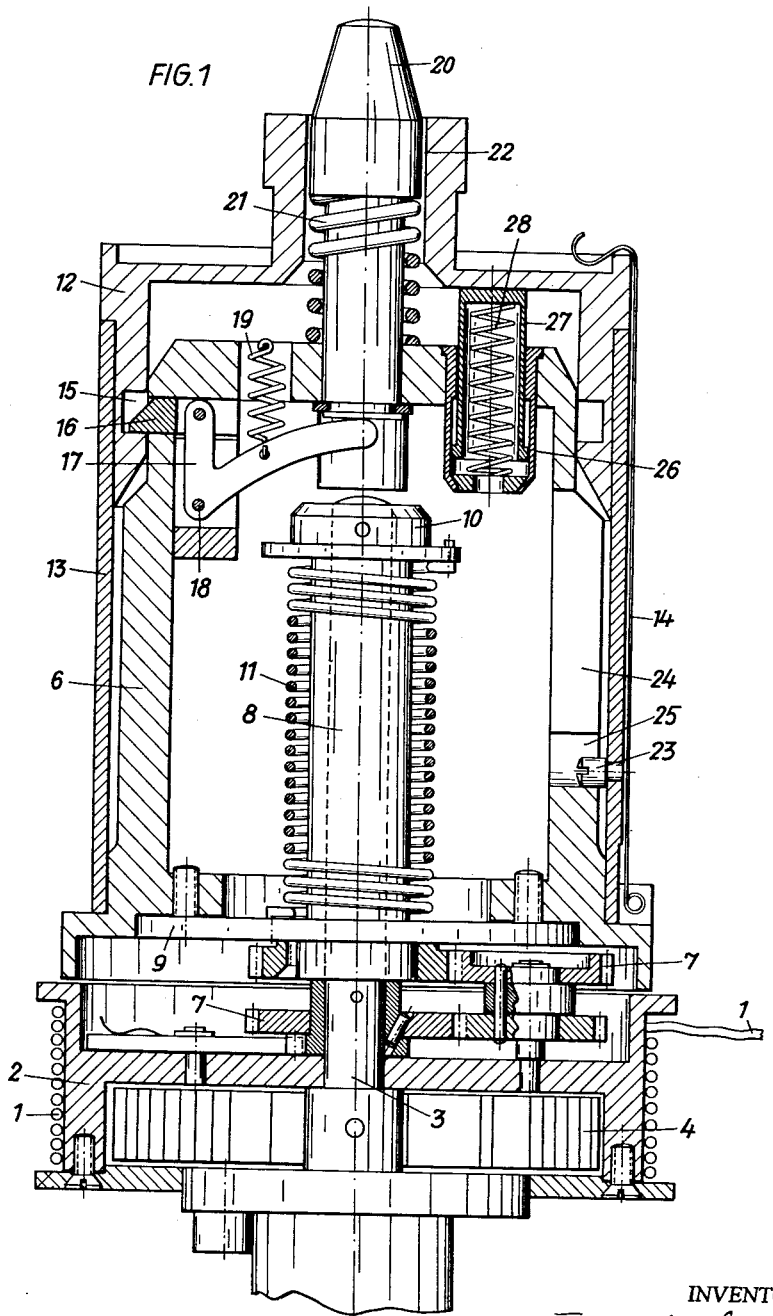

May 30, 1961

F. LEÜTERT 2,986,443

RECORD DRUM MOUNTING

Filed May 8, 1959

2 Sheets-Sheet 1

INVENTOR.
Friedrich Leutert
BY Ernest Montague
Attorney

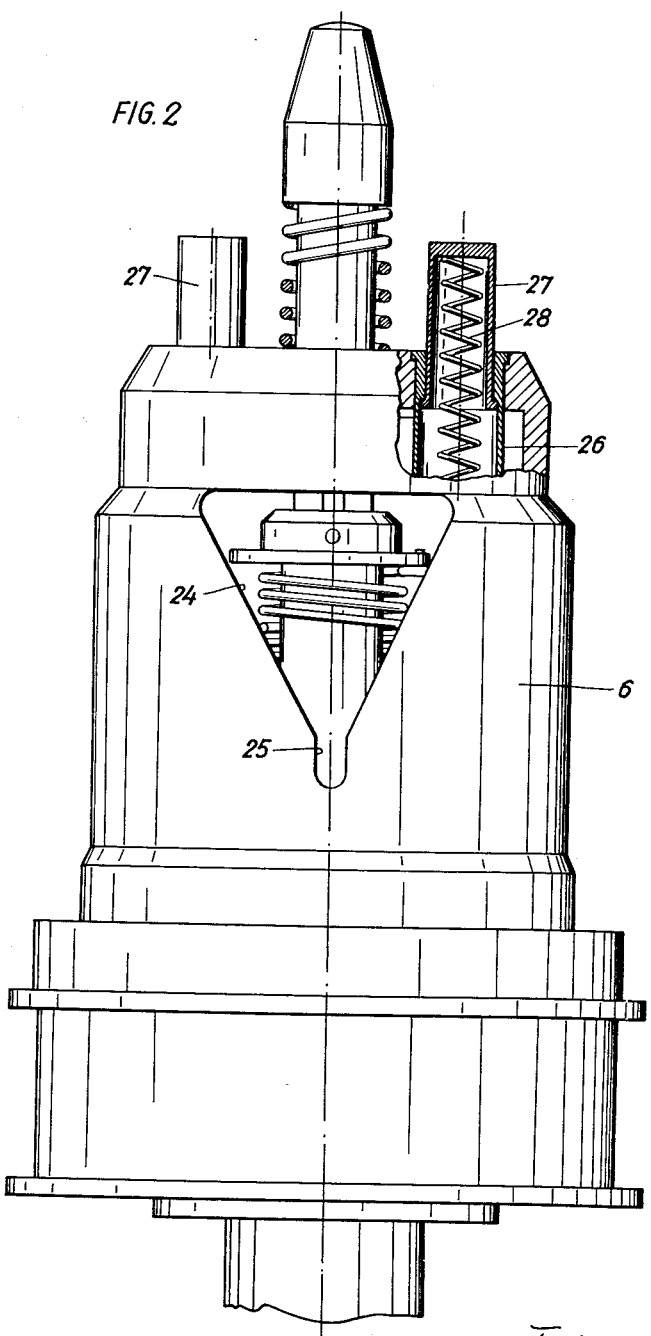

United States Patent Office 2,986,443
Patented May 30, 1961

2,986,443
RECORD DRUM MOUNTING
Friedrich Leütert, Erbstorf, near Luneburg, Germany
Filed May 8, 1959, Ser. No. 812,065
2 Claims. (Cl. 346—138)

The present invention relates to recorders.

In machine sets it is often necessary to perform and record measurements on moving parts of construction, the function of which is independent of the entire set. It has been proposed to feed these measurements to electrical components and to transmit them to remote indicating instruments. This solution requires in most cases highly complicated devices and is by no means free of error, so that the relatively high expenditure is hardly justified.

As contrasted therewith, mechanically operating recorders which comprise a recording drum and are rotated in dependence upon a moved machine part and attached to this moved machine part itself are much simpler, less expensive and more reliable in operation but involve the difficulty that the replacement of the chart paper or of the recording drum carrying the chart paper requires the machine to be shut down.

A particularly difficult case is obtained, when shutdowns are not possible or would falsify the actual operation record. An example of such case is a pump for deep oil wells. In this case a temporary shutdown of the pump would cause an undesirable loss of production and would entirely change the actual operative condition as a result of the continued flow to the pump. This applies particularly to prolonged shutdowns. In this case a prolonged time is required to reestablish the normal condition. Finally, the shutdown of the pump may give rise to trouble, residing in clogging with paraffin or sand or the like. Similar disadvantages are also obtained in other working machines.

It is one object of the present invention to provide a device for replacing the recording drum of moved recorders of that type in which the recording drum carrying the chart paper is axially fitted on a carrier drum and in which the disadvantages of the known arrangements are eliminated to a high degree.

It is another object of the present invention to provide recorders which enable the application of mechanical recorders also to moved machine parts.

It is still another object of the present invention to provide recorders wherein the drum which carries the chart paper is held by externally releasable latch means against the action of a spring, the latter tending to axially remove the drum which carries the chart paper. In such an arrangement it is sufficient to release the latch means, e.g., by the actuation of a push button, for removing the drum. This can readily be effected also during operation.

With these and other objects in view which will become apparent in the following detailed description, the present invention will be clearly understood in connection with the accompanying drawings, in which:

Figure 1 is an axial sectional view showing a recording drum with a driving and removing device; and Fig. 2 is an elevation of the drum carrier alone (after removal of the recording drum), viewed from an angle of 90° with respect to Fig. 1.

The illustrative embodiment shown relates to a recording drum as is used, e.g., in conjunction with pumps in deep oil wells. The dynamometer which measures the working load applied to the pump rod is inserted between the top end of the pump rod and the member whereby power is applied to the pump rod, e.g., the cross-head of the pump. The ordinates of the pressure or load diagram to be recorded are supplied by said dynamometer. The abscissa of the chart is supplied by a cord 1, one end of which is affixed to a fixed point, e.g., to the top end of the drill pipe whereas the other end is affixed to a grooved pulley 2, which is carried by the drum shaft 3 and under the action of a return spring 4. It is obvious that this grooved pulley may be replaced by a toothed wheel drive, a friction wheel drive or another suitable type of drive which causes an appropriate transmission of the movement of the operation to be measured.

A recording drum carrier 6 is connected to the grooved pulley 2 by a reducer gear, in the present case an epicyclic gear 7, and is rotatably mounted on the drum shaft 3 by means of a bearing sleeve 8, which is connected by the disc 9 to the carrier 6. The adjusting ring 10 serves as an upper limit for the bearing and also for fixing a coil spring 11, which is hung with one free end in the adjusting ring 10 and with the other free end in the recording drum carrier 6 and prestressed in the reverse sense of rotation.

In this device the spring 4 acts in opposition to the spring 11. The torque required for this purpose is practically insignificant. It is thus achieved, however, that the tooth clearance in the gear is always on the same side so that it will not falsify the record as would be the case if the teeth of the gear engaged on one side during the forward movement and on the other side during the return movement.

The epicyclic gear 7 does not only serve for transmitting the movement of the grooved pulley 2 to the recording drum carrier 6 but also reduces the movement of the latter in the correct proportion to obtain for each stroke the correct abscissa length on the chart.

The recording drum 12 carries a cylinder 13, to which the chart paper is affixed with a clip spring 14, and has an internal groove 15, which receives the tongue 16 of a bell-crank lever 17. The bell-crank lever 17 is mounted on the recording drum carrier 6 for rotation on a transverse axis 18 and is under the action of a tension spring 19 and with its pivoted tongue 16 protrudes through a square hole out of the recording drum carrier 6. The bell-crank lever 17 is operable by a push button 20, which is slidably mounted in the recording drum carrier 6 and under the action of a return spring 21 and protrudes out through a bore 22 from the end wall of the recording drum 12.

In order to facilitate the fixation of the drum 12 with the cylinder 13 in the correct position on the carrier 6, the cylinder 13 has an inwardly protruding pin 23. This pin is preferably disposed at the point where the chart paper is affixed so that the position is readily apparent from the outside.

The recorder drum carrier 6 has a V-shaped milled groove 24 (Fig. 2), which serves as a guide for the pin 23. When the recording drum 12 is mounted on the drum carrier 6, it is sufficient to ensure that the pin 23 is adjacent to the guide groove 24. It will then automatically slide into the vertex 25 of the groove 24 to reach the proper initial position for the chart paper. This is of special importance because, as has been mentioned hereinfore, the entire attendance is performed while the recorder and all parts connected thereto are in motion. At the base of the drum carrier 6, two opposed ejectors 27 (staggered by 90° in Fig. 1) are mounted in small cylinders 26 and under the action of compression springs 28 inserted therein bear against the end of the drum 12, which is held fast in operative condition by the nose 16.

The mode of operation of this device is as follows:

As soon as the record on a chart sheet has been completed, the button 20 is pressed with the flat hand when the recording drum comes into reach. This will cause the nose 16 to be retracted so that the ejectors 27 urge the drum 12 away from the carrier 6 and the drum 12 falls into the hand of the operator.

At the same time the other hand lifts the preferably resilient and releasable recording stylus of the recording device. If an excessive velocity of the machine part to which the recording device is affixed prevents the lifting of the recording stylus at the same time, the stylus is lifted first and the button 20 is operated at the next stroke, when the recording device is again in reach.

Immediately thereafter a new drum from a stock of prepared recording drums on which recording paper has been applied is fitted on the drum carrier 6 when the same is again in reach. The guide 24 enables this application to be performed within a fraction of a second. Then the recording stylus is again applied and the recording operation proceeds.

While I have disclosed one embodiment of the present invention, it is to be understood that this embodiment is given by example only and not in a limiting sense, the scope of the present invention being determined by the objects and the claims.

What I claim is:

1. A continuously moving recorder adapted to be connected with a reciprocating piston rod of a pump for oil production, comprising a recording carrier, means for continuous rotation of said recording carrier, a recording drum receiving a chart paper and having a recess disposed at a distance from the end of said recording drum in axial direction such as to set said recording drum at a predetermined location on said recording carrier, said recording drum being mounted on said recording carrier, resilient means in said recording carrier tending the removal of said recording drum from said recording carrier in axial direction, spring biased locking means secured to said recording carrier and adapted to project into said recess of said recording drum, in order to retain and lock said recording drum on said recording carrier against the force of said resilient means, a push button disposed outside of said recording drum and operatively connected with said spring biased means, the operation of said push button unlocking said recording drum from said recording carrier, the latter having a substantially axially disposed V-shaped slot, the taper of said slot widening in the direction of removal of said recording drum, and the latter having an inwardly directed pin received in the apex of said V-shaped slot, in order to locate the correct position of said recording drum on said recording in peripheral direction by said V-shaped slot, and in axial direction by said locking means, and said spring biased locking means being accurately aligned opposite said recess of said recording drum in the mounted position of the latter to permit entrance of said spring biased locking means into said recess, so that said recording drum is locked with said recording carrier.

2. The recorder, as set forth in claim 1, wherein said recording carrier is of drum shape, and said spring biased means comprises a lever pivotally secured to said recording carrier, a tongue carried by said lever, a spring secured to said recording carrier and acting on said lever to urge said tongue into said recess of said recording drum, said push button slidably mounted in said recording carrier and operable to cause said lever to withdraw said nose from said recess, and spring means associated with said push button for returning the latter to its normal position.

References Cited in the file of this patent
UNITED STATES PATENTS

| | | |
|---|---|---|
| 2,010,717 | Gramann | Aug. 6, 1935 |
| 2,740,686 | Kirchel | Apr. 6, 1956 |
| 2,875,874 | Foret et al. | Mar. 3, 1959 |